Patented Jan. 17, 1933

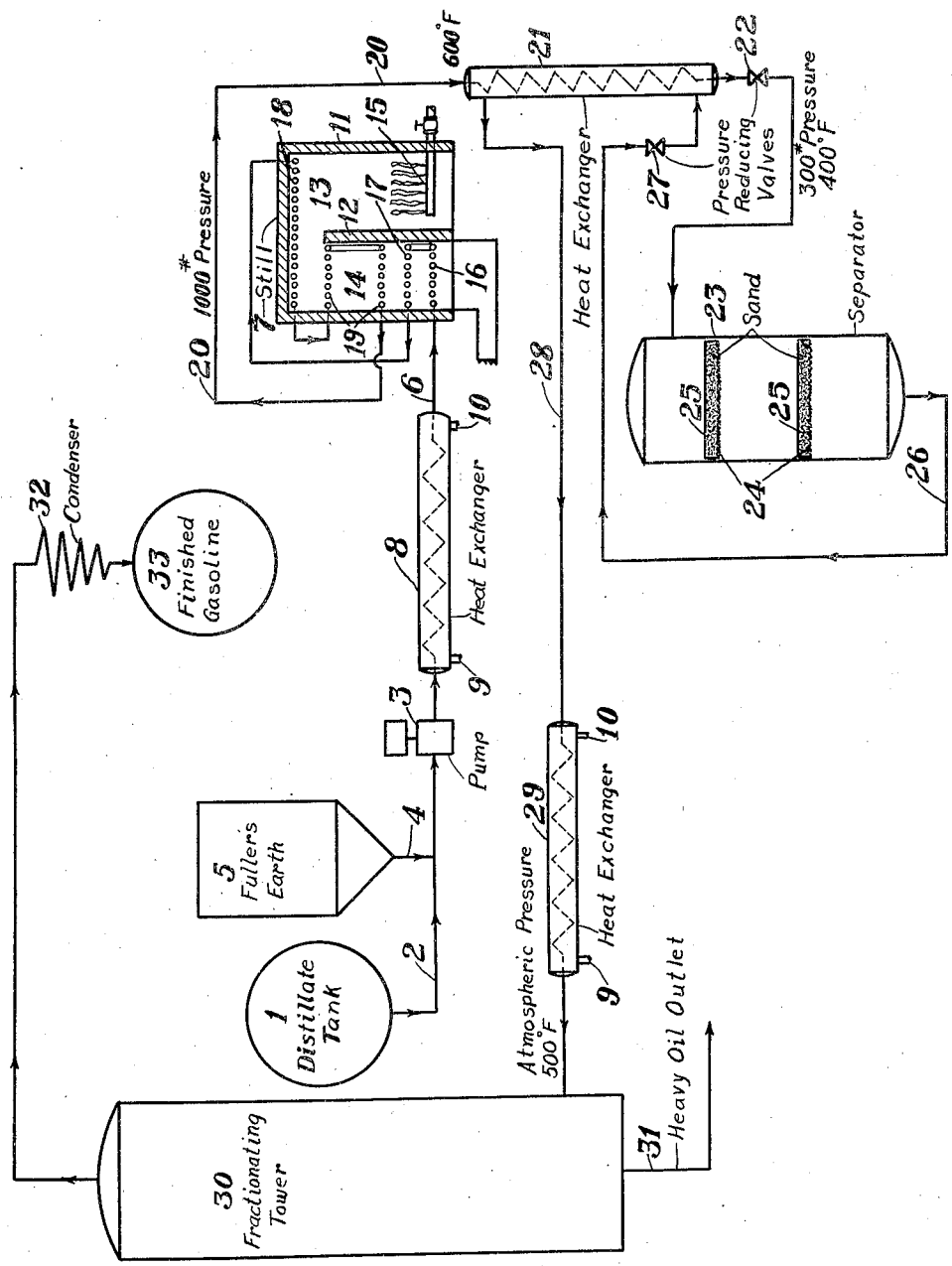

1,894,331

UNITED STATES PATENT OFFICE

CORNELIUS B. WATSON, OF CHICAGO, ILLINOIS, ASSIGNOR TO THE PURE OIL COMPANY, OF CHICAGO, ILLINOIS, A CORPORATION OF OHIO

LIQUID PHASE POLYMERIZATION OF HYDROCARBON OILS

Application filed March 18, 1930. Serial No. 436,697.

This invention relates to the art of removing gum-forming and color-imparting bodies from cracked petroleum distillates. Petroleum distillates obtained from high temperature or vapor phase cracking systems, contain unsaturated compounds in the form of undesirable diolefines which, if permitted to remain in the distillate, promote or result in the formation of the gum and color compounds which are highly undesirable in a finished motor fuel.

It is, therefore, an outstanding object of the present invention to provide a continuous, effective and efficient method for treating such cracked distillates whereby the undesirable compounds are subjected to rapid polymerization reactions in order to produce in the distillates under treatment the formation of high boiling polymers which comprise the undesirable compounds, whereby through subsequent fractionation the polymers may be removed completely from the desired lighter low boiling fractions, permitting the latter to be separately collected and stored as finished motor fuel distillate and free from the color and gum forming compounds.

In earlier systems proposed for this polymerization and purification of cracked petroleum distillates it has been customary to effect the polymerization reactions by vaporizing the untreated distillates and then bringing the latter while in a vaporized form into intimate contact with fuller's earth disposed in a stationary bed in an enclosed chamber. This method has been found to be objectionable for the reason that the fuller's earth rapidly loses its apparent catalytic activity after relatively short periods of use due to the accumulations on the clay particles thereof of the gums or polymers, with the result that the fuller's earth must be frequently changed in order to secure or maintain a desired rate of polymerization. Not only are the material costs relatively high from the standpoint of commercial operation but in addition the labor costs are quite high in the matter of controlling the admission and discharge of the clay from the treating system.

It is, therefore, a principal object of the present invention to provide a polymerization system wherein the oil or distillates to be treated are continuously passed together with the fuller's earth in a stream of restricted cross-section through a heating still, and wherein the oils while passing through said still are maintained under super-atmospheric pressures sufficiently high to keep the oil in the liquid phase at the elevated temperatures to which it is subjected while passing through the still.

It is a further object of the invention to pass the oils from the still while under pressure into a separator wherein the catalyst, which may be fuller's earth, is removed from the oils under treatment while such oils are still maintained under the liquid phase, and in finally passing the oils into a fractionating zone, wherein the pressure thereon is removed to permit of the separation of the desired low boiling distillates from oils of higher boiling point, the low boiling oils being subsequently condensed and collected as finished motor fuel.

For a further understanding of the invention reference is to be had to the following description and the accompanying drawing, wherein is disclosed diagrammatically apparatus used in carrying the invention into practical operation.

Referring more particularly to the accompanying drawing, the numeral 1 designates a tank in which is contained the cracked distillate which is to be treated in accordance with the present invention. This cracked distillate consists ordinarily of hydrocarbon oils produced by cracking processes and having the boiling range of ordinary gasoline. Such cracked distillates, particularly distillates obtained by vapor phase cracking, contain highly reactive compounds in the form of unsaturates which are readily attacked by air and light and which as a result produce in the distillates undesirable color and gum compounds. It is to the removal of these undesirable unsaturated compounds that the present invention is principally directed.

Leading from the tank 1 is a pipe line 2 which enters the suction side of a high pressure pump 3. Also entering the suction or inlet side of the pump 3 is a pipe line 4 which leads from a hopper 5 adapted for the reception of a catalyst such as fuller's earth. By means of the pump 3 regulated quantities of this catalyst are mixed with the distillate drawn from the tank 1 and this combined oil and catalyst mixture is then forced through a pipe line 6 which leads to a still or other heated area 7. If desired, a heat exchanger 8 may surround a portion of the pipe line 6 in order to preheat the oil-clay mixture during the flow of the latter from the pump 3 to the still 7. A heated fluid, obtained from any suitable source, may enter the exchanger as at 9 and escape by way of the outlet 10. In most refineries there is usually a source of either super-heated steam or hot oil, obtained from adjoining operations, which may be employed economically for preheating the oil-clay mixture during the flow of the latter through the exchanger 8.

The pipe still 7 comprises a setting 11 divided internally by a bridge wall 12 into combustion and tube chambers 13 and 14 respectively. Burners 15 are arranged in the combustion chamber to secure desired temperatures. The oil-clay mixture enters and flows serially through a horizontal pass of tubes 16 arranged in the bottom of the tube chamber 14 and then passes serially through a second pass of tubes 17 arranged horizontally in the chamber 14 immediately over the first pass of tubes 16. From the second pass of tubes 17 the oil-clay mixture flows serially through a horizontal row of tubes 18 arranged in or near the roof of the setting 11 and which tubes are so positioned as to obsorb a material portion of the radiant heat energy developed in the combustion chamber 13. This is permissible without substantially cracking the oil since the temperature of the oil at the time it enters the roof tubes 18 is not sufficiently high to permit of cracking to any material extent. From the roof tubes 18 the oil-clay mixture passes through horizontally arranged rows of tubes 19 disposed in the chamber 14 between the tubes 17 and the roof tubes 18. The oil-clay mixture in passing through the tubes 19 flows substantially concurrently with the flow of furnace gases through the chamber 14, while the said mixture in passing through the tube banks 16 and 17 flows in counter-current or opposed relation to the flow of the furnace gases. This arrangement of tubes provides for the effective heating of the oil to the desired temperatures of treatment in an economical and effective manner and without likelihood of the oil being materially cracked. The oil-clay mixture thus heated attains a temperature of substantially 600° F. However, vaporization thereof is prevented by reason of the super-atmospheric pressures present on the mixture, which pressures are usually of the order of approximately 1000 pounds per square inch, which are more than sufficient to keep the oil-clay mixture in the liquid phase. Due to the high temperatures of treatment together with the super-atmospheric pressures employed, an intimate contact is secured between the fuller's earth and the oils undergoing treatment. The presence of the fuller's earth, it is believed, polymerizes the undesirable unsaturated compounds present in the cracked distillate withdrawn from the tank 1 with the result that the treatment produces in the oils fractions possessing boiling points materially higher than the oils contained in the tank 1. These higher boiling fractions comprise as polymers the undesirable gum-forming and color-imparting bodies present in the oils so that in subsequent fractionation these undesirable high boiling oils may be separately removed from the treated and desired product.

After passing from the pipe still, the oil-clay mixture flows through a pipe line 20 to a heat exchanger 21 wherein the temperature of this oil-clay mixture is reduced from approximately 600° F. to a temperature of approximately 400° F. At the outlet side of the exchanger 21 there is arranged a pressure reducing valve 22 which permits of a reduction in pressure on the mixture from substantially 1000 pounds per square inch to a pressure of substantially 300 pounds per square inch so that the oil-clay mixture at a temperature of 400° F. and a pressure of 300 pounds per square inch is introduced into a clay separator 23. This separator comprises a substantially built casing capable of withstanding internal pressures considerable higher than 300 pounds per square inch. Within this separator there is arranged a pair of superposed trays 24 of perforate construction which supports beds of sand as indicated at 25. Through the provision of these sand beds the clay content of the oils undergoing treatment is removed by filtration, the sand beds permitting the oil to pass through to the bottom of the separator while retaining the fuller's earth therein. After a certain period of operation the separator is shut down to permit of the removal of the sand-clay mixture and during this period the treated oils are directed into another separator, not shown, corresponding to the separator 23, it being understood that these separators are used alternatively so that the continuous operation of the system may be maintained without interruption during the removal or insertion of material from or on the trays 24.

The oils passing through the separators 23 are still maintained in the liquid phase in spite of the reduced pressures due to the fact that the temperatures of the oil have been reduced by the operation of the exchanger 21. Thus by the provision of this arrangement the oils undergoing treatment while in contact with the clay are constantly maintained in the liquid phase. This feature has been found to be of particular benefit in the matter of reducing to a minimum the clay feeding requirements of the system and also in the matter of securing a treated end product having a very low or negligible gum content and of desired color.

From the bottom of the separator or separators 23 a pipe line 26 extends back to the heat exchanger 21. In this pipe line there is arranged a second pressure reducing valve 27 by which high pressures on the oils undergoing treatment are removed and pressures retained of such magnitude as to permit of the desired flow of the treated oils or vapors through the remaining units of the system. Thus the oils or vapors led into the heat exchanger 21 by way of the line 26 are again reheated by indirect contact with the oil-clay mixture passing through the line 20. If desired, the oils or vapors discharged from the exchanger 21 by way of the pipe line 28 may be passed through a third heat exchanger 29 so that the oils or vapors will attain a temperature of approximately 500° F., or any other suitable fractionating temperature. These heated oils or vapors are then flashed into a fractionating tower 30, the polymerized high boiling oils being removed by way of the pipe line 31 from the bottom of the tower, whereas the desired lighter polymer-free oils pass in vaporous form through the fractionating tower and escape overhead, these vapors being subsequently condensed by passage through the condenser 32 and collected in liquid form as a finished and treated motor fuel distillate in the tank 33.

Thus the invention is such that by means of the high temperature and high pressure which are sufficient to maintain the oil in the liquid phase, the erosion commonly experienced when vapor and clay pass through heated tubes and towers at high velocity incidental to low temperatures and low pressures, will be greatly minimized.

What is claimed is:

1. The method of removing gum-forming and color-imparting bodies from cracked hydrocarbon oils containing unsaturated compounds, which comprises producing a mixture of such oils with a comminuted solid adsorbent, then passing said mixture through a heating zone wherein the oils of the mixture are subjected to temperatures in excess of their normal vaporization temperatures but insufficient to effect any material cracking thereof, maintaining the oils in the mixture while passing through said zone under the conditions of temperature specified in substantially the liquid phase by the employment of superatmospheric pressures of the order of 1000 pounds on said oils sufficient to inhibit vapor evolution, then passing said mixture under partially reduced temperature and pressures of the order of 300 to 500 pounds and temperatures but with the oils thereof still in the liquid phase through a separating zone, removing from the mixture during its passage through said separating zone the adsorbent content thereof, substantially removing the pressure from the adsorbent freed oils to vaporize the latter without reheating the same, and subjecting said vaporized oils to fractionation to remove high boiling polymerized bodies from the treated vapors.

2. The method of removing gum-forming and color-imparting bodies from cracked hydrocarbon oils containing unsaturated compounds, which comprises producing a mixture of such oils with a comminuted solid adsorbent, passing said mixture through a heating zone wherein the oils of the mixture are subjected to temperatures in excess of their normal vaporization temperatures but insufficient to effect any material cracking of said oils, maintaining the oils of the mixture while passing through said heating zone in the liquid phase by the employment of pressures on said oils of the order of 1000 pounds and of sufficient magnitude to substantially inhibit the liberation of oil vapor at the temperature specified, removing the mixture from the heating zone and passing the same under partially reduced temperatures and pressures and while still in substantially the liquid phase through a separating zone, removing from the mixture during passage thereof through said separating zone its adsorbent content, then removing the pressure from the adsorbent freed oils to vaporize the latter, and subjecting such vaporized oils to fractionation to remove therefrom high boiling polymerized bodies from the treated vapors.

3. The method of removing gum-forming and color-imparting bodies from cracked petroleum oils containing unsaturated compounds which comprises: heating a mixture consisting of such oils and a comminuted solid absorbent to a temperature above the normal vaporization temperature of the oils and coincidentally applying pressure of the order of 1000 pounds per square inch to substantially prevent the evolution of oil vapors, then filtering the absorbent from the oils of the mixture while maintaining the oils in the liquid phase at temperatures above the normal vaporizing temperatures thereof, then reducing the pressure on the oils to effect their vaporization, and fractionating the vaporized oils to separate from such oils the polymerized compounds from the desired treated fractions thereof.

4. The method of removing gum-forming and color-imparting bodies from cracked petroleum oils containing unsaturated compounds which comprises: heating a mixture comprising such an oil and fuller's earth to a temperature above the normal vaporizing temperatures of the oil and coincidentally applying pressure of the order of 1000 pounds per square inch to prevent the evolution of oil vapors, then filtering the fuller's earth from the oils while the latter are maintained in the liquid phase at temperatures above their normal vaporizing temperatures, and reducing the pressure on the oils following removal of the fuller's earth therefrom to effect the vaporization of said oils without reheating the same, and then fractionating the vaporized oils to remove therefrom high boiling polymerized bodies from the treated and remaining vapors.

5. The method of removing gum-forming and color-imparting bodies from cracked petroleum oils containing unsaturated compounds which comprises: heating a mixture consisting of such an oil and a finely divided solid catalyst to temperatures of the order of 600° F., coincidentally applying pressures of the order of substantially 1000 pounds per square inch to the oils undergoing such heating to prevent the evolution of oil vapors, then passing the mixture through a separating zone while said oils are maintained under a pressure of the order of 300 pounds per square inch and at a temperature of approximately 400° F., removing the catalyst from said oils during the passage of the latter through the treating zone, further reducing the pressure on said oils following release thereof from the separating zone to effect the vaporizing of said oils without reheating the same, then fractionating said vaporized oils to remove therefrom high boiling polymerized bodies, and condensing and collecting the treated vapors.

6. The method of removing gum-forming and color-imparting bodies from cracked petroleum oils containing unsaturated compounds which comprises: heating a mixture consisting of such oils and a finely divided solid catalyst to a temperature above the normal vaporization point of the oils and coincidentally applying pressure to prevent the evolution of oil vapors, then filtering the catalyst from the oils while the latter are maintained in the liquid phase but at temperatures and pressures below those which obtain in the primary heating thereof, passing the catalyst freed oils into heat exchanging relationship with the oil-catalyst mixture when the latter is maintained under the conditions of temperature and pressure first above given, then further reducing the pressure on said catalyst freed oils to effect their vaporization without reheating, fractionating the vaporized oils to remove therefrom undesirable polymerized bodies, and separately condensing and collecting the desired treated vapors.

In testimony whereof I affix my signature.
CORNELIUS B. WATSON.